United States Patent
Weis et al.

(10) Patent No.: US 10,454,887 B2
(45) Date of Patent: Oct. 22, 2019

(54) ALLOCATION OF LOCAL MAC ADDRESSES TO CLIENT DEVICES

(71) Applicant: Cisco Technology, Inc., San Jose, CA (US)

(72) Inventors: Brian Eliot Weis, San Jose, CA (US); Peter Geoffrey Jones, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 647 days.

(21) Appl. No.: 14/944,743

(22) Filed: Nov. 18, 2015

(65) Prior Publication Data
US 2017/0142064 A1    May 18, 2017

(51) Int. Cl.
*G06F 15/173* (2006.01)
*H04L 29/12* (2006.01)
*H04L 29/06* (2006.01)

(52) U.S. Cl.
CPC ...... *H04L 61/6022* (2013.01); *H04L 61/2038* (2013.01); *H04L 63/0428* (2013.01); *H04L 63/061* (2013.01); *H04L 63/08* (2013.01); *H04L 63/123* (2013.01); *H04L 63/162* (2013.01)

(58) Field of Classification Search
CPC ............... H04L 9/083; H04L 29/12254; H04L 61/2038; H04L 61/6022; H04L 63/0435; H04L 29/12216; H04L 29/1233; H04L 61/2092; H04L 63/0281; H04W 12/06
See application file for complete search history.

(56) References Cited

U.S. PATENT DOCUMENTS

| | | | |
|---|---|---|---|
| 8,082,458 B2 | 12/2011 | Kay | |
| 10,299,126 B2* | 5/2019 | Bryksa | .............. H04W 12/06 |
| 2003/0177267 A1* | 9/2003 | Orava | .............. H04L 29/12254 |
| | | | 709/245 |
| 2004/0006642 A1* | 1/2004 | Jang | .............. H04L 29/12254 |
| | | | 709/245 |
| 2006/0098644 A1 | 5/2006 | Pullela et al. | |
| 2006/0120317 A1* | 6/2006 | Zheng | .............. H04L 29/12216 |
| | | | 370/315 |
| 2007/0280207 A1* | 12/2007 | Shimizu | .............. H04L 29/1233 |
| | | | 370/353 |

(Continued)

OTHER PUBLICATIONS

"Configuring port security with sticky MAC addresses", http://www1.brocade.com/downloads/documents/html_product_manuals . . . , downloaded from the internet on Nov. 18, 2015, 1 page.

*Primary Examiner* — Dustin Nguyen
(74) *Attorney, Agent, or Firm* — Edell, Shapiro & Finnan, LLC

(57) ABSTRACT

At a network device configured to control access to a network, a client device authentication request is received from a client device. The request includes identity credentials and a temporary media access control (MAC) address of the client device. The client device is successfully authenticated based on the identity credentials. After authentication, a new MAC address is established in the client device. A data frame is received from at the network device. It is determined whether the client device is using the new MAC address based on the received data frame. If it is determined that the client device is using the new MAC address, the client device is permitted access the network.

21 Claims, 12 Drawing Sheets

(56) References Cited

U.S. PATENT DOCUMENTS

| | | | |
|---|---|---|---|
| 2008/0130889 A1* | 6/2008 | Qi | H04L 63/0435 |
| | | | 380/257 |
| 2009/0190598 A1 | 7/2009 | Christensen et al. | |
| 2012/0023207 A1* | 1/2012 | Gandhewar | H04L 61/2038 |
| | | | 709/221 |
| 2013/0103939 A1* | 4/2013 | Radpour | H04L 9/083 |
| | | | 713/152 |
| 2013/0195109 A1* | 8/2013 | Ogawa | H04L 63/0281 |
| | | | 370/392 |
| 2013/0346628 A1 | 12/2013 | Canion et al. | |
| 2015/0063205 A1* | 3/2015 | Elliott | H04L 61/6022 |
| | | | 370/328 |
| 2015/0095501 A1* | 4/2015 | Candelore | H04L 61/2092 |
| | | | 709/227 |
| 2016/0302058 A1* | 10/2016 | Mestanov | H04L 61/2038 |
| 2017/0013449 A1* | 1/2017 | Raman | H04W 12/06 |

* cited by examiner

ALLOCATION OF LOCAL MAC ADDRESSES TO CLIENT DEVICES

TECHNICAL FIELD

The present disclosure relates to allocating Media Access Control (MAC) addresses to client devices in a controlled manner.

BACKGROUND

Ethernet addresses are typically 48-bit values, managed by The Institute of Electrical and Electronics Engineers (IEEE) 802 Registration Authority Committee (RAC). Organizations desiring globally unique Ethernet addresses apply for and purchase blocks of Ethernet addresses. The 48-bit address space is finite, and new Ethernet use cases could consume globally unique addresses at a staggering rate. For example, deployment of cheap Internet-of-Things (IoT) sensors (in many cases battery powered and with a short lifetime), and the rapidly increasing numbers of virtual machines in a data center are both situations that could consume huge blocks of Media Access Control (MAC) addresses. Another type of Ethernet address defined by IEEE 802 is the "local" address type. Local MAC addresses are an alternative to globally unique MAC addresses when a MAC address of a device is not bridged beyond a local network. Conventional address allocation protocols permit an organization to allocate local MAC addresses at random in an uncontrolled, uncoordinated manner leading to address collisions in the local network.

DESCRIPTION OF EXAMPLE EMBODIMENTS

Overview

At a network device configured to control access to a network, a client device authentication request is received from a client device. The request includes identity credentials and a temporary media access control (MAC) address of the client device. The client device is successfully authenticated based on the identity credentials. After authentication, a new MAC address is established in the client device. A data frame is received at the network device. It is determined whether the client device is using the new MAC address based on the received data frame. If it is determined that the client device is using the new MAC address, the client device is granted access to the network.

Example Embodiments

Standardization of local MAC address allocation will likely lead to a greatly increased use of local MAC address pools and help reduce stress on the over-assignment of global MAC address space. Organizations use conventional address allocation protocols to allocate and manage local MAC addresses with respect to networked client devices. The conventional address allocation protocols permit the organizations to allocate the local MAC addresses at random. In addition, the conventional address allocation protocols may be used with shared networks where different organizations may allocate MAC addresses in an uncoordinated manner. Thus, when the allocated MAC addresses are bridged in the same domain, address collisions may occur.

Ideally, address allocation protocols should allow organizations to allocate ranges of local MAC addresses that do not collide with each other, and to ensure there are no duplicate MAC addresses allocated within a single organization. Accordingly, embodiments presented herein present new address allocation protocols to allocate MAC addresses to client devices in a controlled, secure manner, and avoid address collisions. The embodiments further control acceptance of data frames from client devices, to which MAC addresses have been allocated, into organizational networks based on whether the client devices are legitimate.

Figure 1:
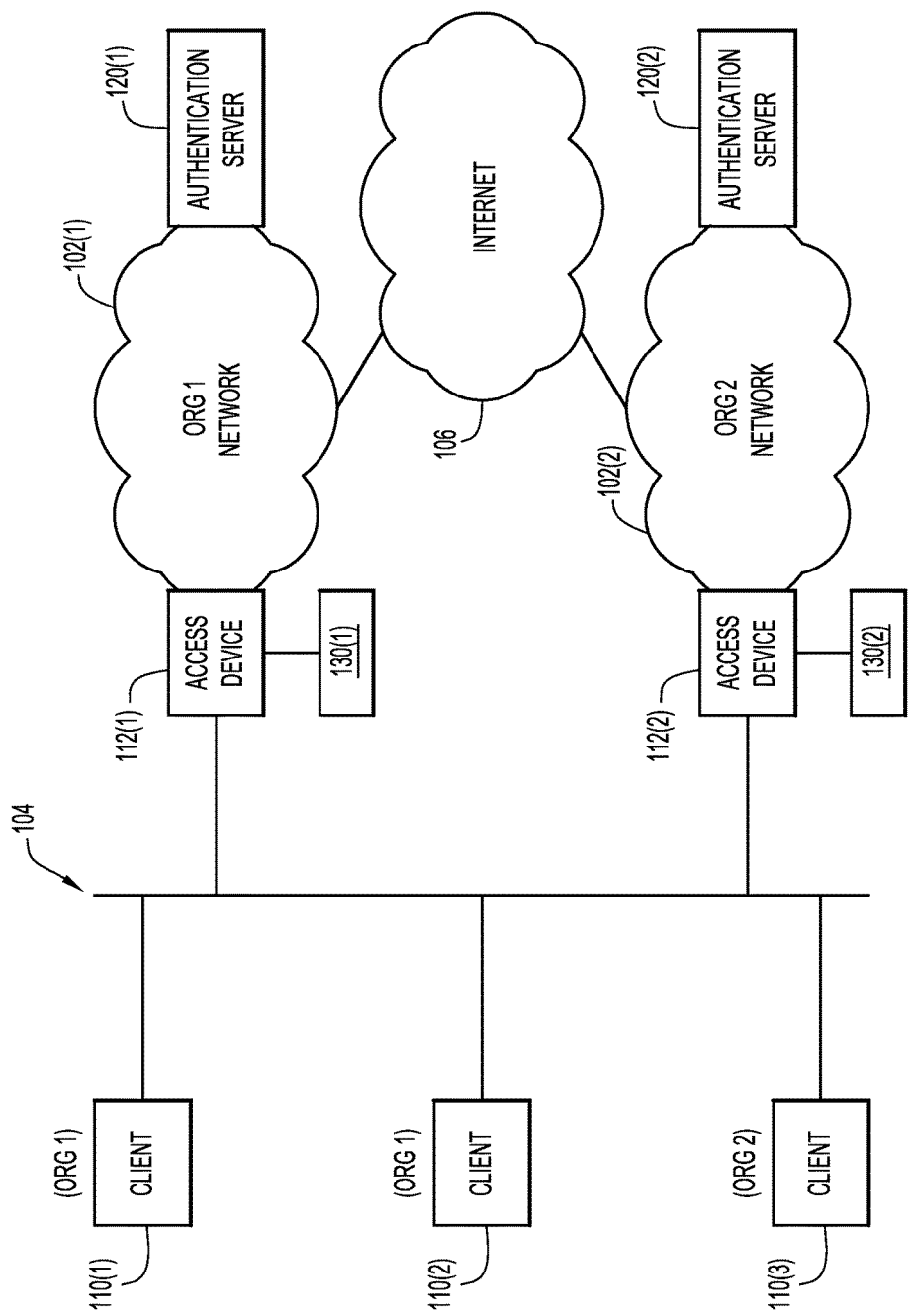
FIG. 1 is a block diagram of a network environment in which embodiments directed to local MAC address allocation protocols may be implemented, according to an example embodiment.

Referring to FIG. 1, there is shown a block diagram of an example network environment 100 in which various address allocation protocols may be used to allocate local MAC addresses to client devices. Network environment 100 includes a network infrastructure shared among multiple organizations Org 1 and Org 2. Network environment 100 includes organizational networks 102(1) and 102(2) associated with respective organizations Org 1 and Org 2, a shared bridge network 104 such as a local area network (LAN), and a wide area network (WAN) 106, such as the Internet, accessible to the organizational networks. LAN 104 may include a wired LAN, such as an Ethernet LAN, and/or a wireless LAN (WLAN) that operates in accordance with IEEE 802.11 or 802.15, for example. LAN 104 includes multiple client devices or hosts 110(1) and 110(2) that belong to organization Org 1, and a client device 110(3) that belongs to organization Org 2. Client devices 110 may include Internet-of-Things (IOT) devices and sensors, computers, wireless communication devices, for example. Client devices 110 communicate with network access devices 112(1) and 112(2) over communications links, such as wired and/or wireless links. Network access devices 112 are referred to collectively as "access devices" and individually as an "access device." Access devices 112(1) and 112(2) include network access or edge devices, such as network switches, routers, access points, and the like, to control network access between LAN 104 and organizational networks 102(1) and 102(2), respectively.

Organizational networks 102(1) and 102(2) include or provide access to respective authentication servers 120(1) and 120(2). Access device 112(1) interacts with authentication sever 120(1) to authenticate client devices 110(1) and 110(2) to organizational network Org1. Similarly, access device 112(2) uses authentication server 120(2) to authenticate client 110(3) to organizational network Org2. Access devices 112 have access to respective MAC address pools 130 that contains local MAC addresses available for allocation to client devices 110. In accordance with embodiments presented herein, after client devices 110 have been authenticated, access devices 112 implement address allocation protocols to allocate local MAC addresses from local MAC address pools 130 to various ones of client devices 110 in a controlled and optionally secure/protected manner. Based on the aforementioned authentication and local MAC address allocation, access devices 112 also control whether client devices 110 are permitted to access organizational networks Org 1 and Org 2.

Figure 2:
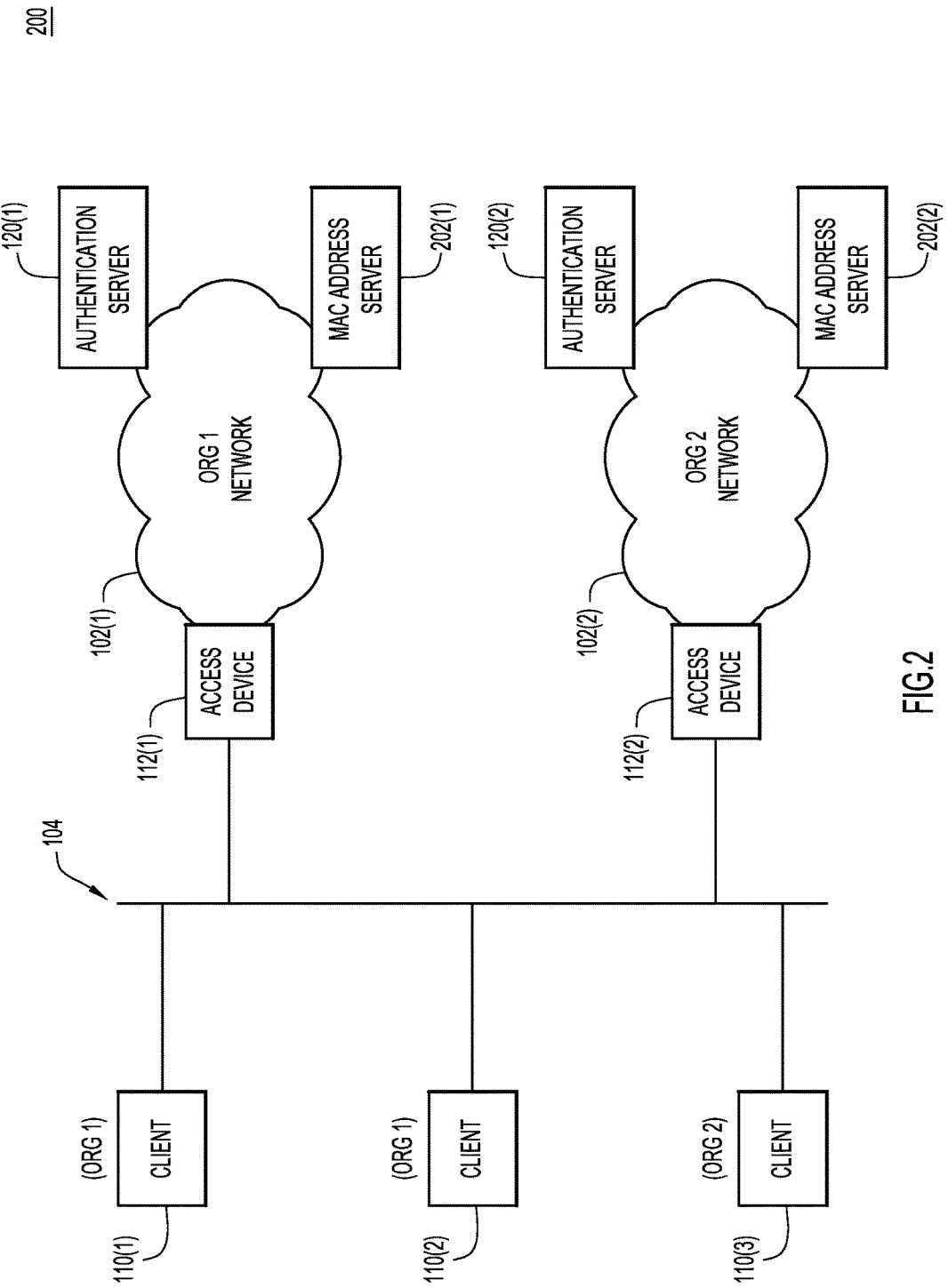
FIG. 2 is a block diagram of another network environment in which embodiments directed to local MAC address allocation protocols may be implemented, according to an example embodiment.

With reference to FIG. 2, there is an example of another network environment 200 in which in which various address allocation protocols may be used to allocate local MAC addresses to client devices 110. Network environment 104 is similar to network environment 102, except that organizational networks Org 1 and Org 2 additionally include respective address servers 202(1) and 202(2) to store respective local MAC address pools and implement address allocation protocols instead of or cooperatively with access devices 112. Access devices 112 and address servers 202 are examples of "network-side" or "network" devices that implement the various address allocation protocols to allocate the local MAC addresses to client devices 110, as described below.

The network environments of FIGS. 1 and 2 are provided by way of example, and it is understood that variations are possible, including many more client devices 110, access devices 112, organizational networks 102, authentication servers 120, and address servers 202. Also, the methods and transactions presented in the ensuing description focus on client device 110(1), access device 112(1), authentication server 120(1), and organizational network 102(1) by way of example. It is understood that the methods and transactions apply equally to other ones of client devices 110, access devices 112, organizational networks 102, and authentication servers 120.

Figure 3:
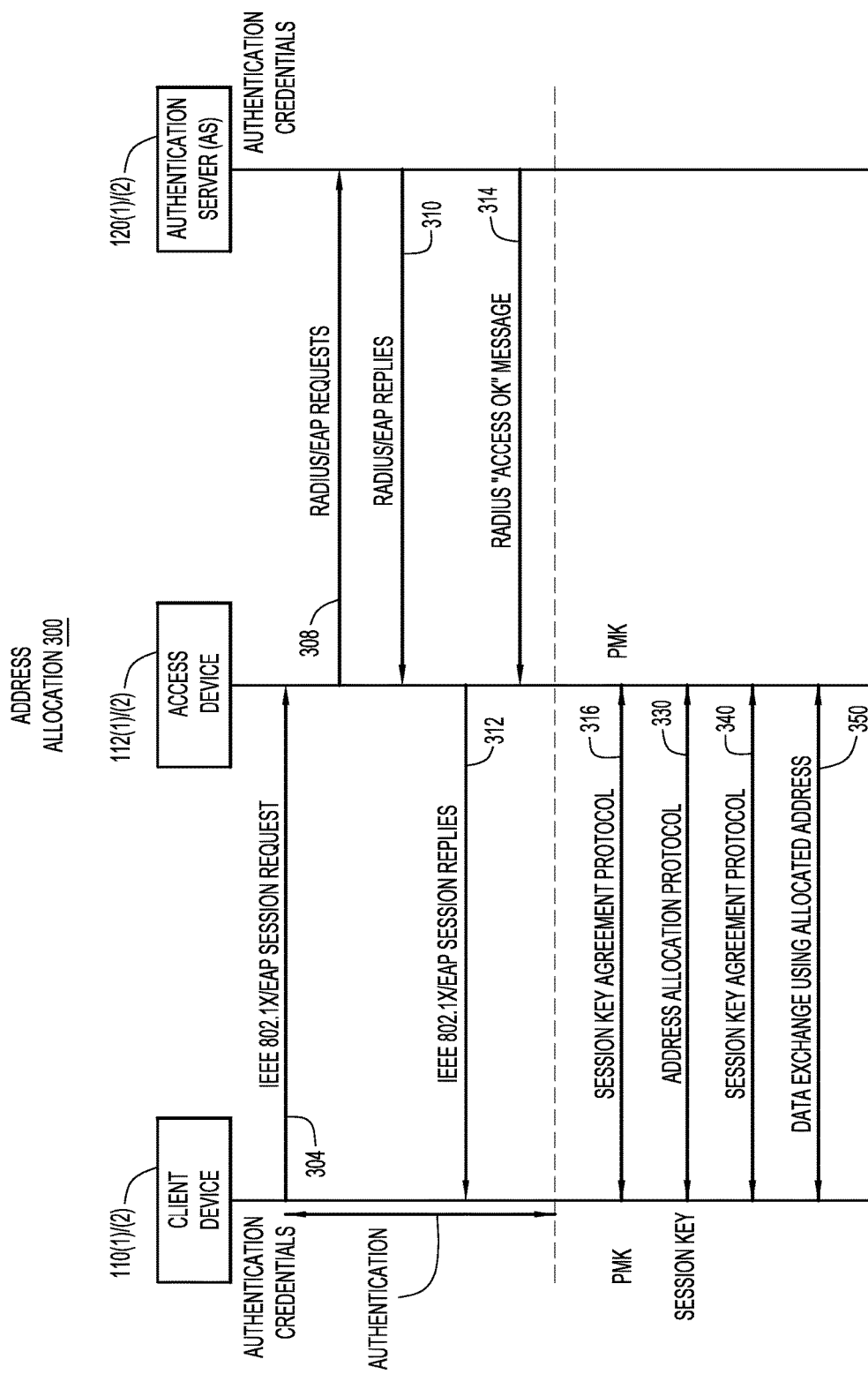
FIG. 3 is a diagram that shows transactions between a client device, a network access device, and an authentication server of the network environment of FIG. 1 used to allocate a local MAC address to the client device and verify use of the local MAC address, according to an example embodiment.

With reference to FIG. 3, there is a diagram that shows example transactions 300 between client device 110(1), access device 112(1), and authentication server 120(1) used to allocate a local MAC address to client device 110(1) and verify use of the local MAC address. In another example, access device 112(1) may be replaced by, or augmented with, address server 202(1). Although the methods described below focus on allocating a local MAC address to a client device, the methods may also be used in allocating any MAC address to a client device, including a global MAC address.

At 304-314, client device 110(1) and authentication server 120(1) exchange messages through access device 112(1) in accordance with an authentication protocol to authenticate client device 112(1) to an access port of access device 112(1). The transactions 304-314 depicted in FIG. 3 are representative transactions only. In practice, authentication may include many more transactions. The authentication protocol may include the Extensible Authorization Protocol (EAP), in which client device 110(1) and access device 112(1) exchange EAP messages over wired or wireless links of LAN 104 under the IEEE 802.1X protocol, while access device 112(1) and authentication server 120(1) exchange the EAP messages under the Remote Authentication Dial-In User Service (RADIUS) protocol. In the context of authentication, client device 110(1) and access device 112(1) are referred to respectively as a "supplicant" and an "authenticator." The authenticator protects access ports and does not allow frames or messages to access a network via the protected access ports unless the frames originate from an authenticated/authorized supplicant. The supplicant attempts to connect with an access port of the authenticator.

At 304, client device 110(1) sends to access device 112(1) one or more authentication session requests including identity/authentication credentials of the client device and a temporary MAC address used by the client device as a MAC source address. The temporary MAC address may be an ephemeral MAC address that is not in a range of MAC address allocated by network device 112(1) in the address allocation protocol (described below). The client device identity credentials may include a user name, password, and/or security certificate (e.g., an IEEE 802.1AR certificate or other manufacturing certificate), although additional/other identity credentials may be used. Access device 112(1) receives the authentication session request(s) and, at 308, forwards the authentication session request(s) to authentication server 120(1). The authentication session request initiates authentication of client device 110(1) by authentication server 120(1). Responsive to the authentication session request(s), at 310 and 312 authentication server 120(1) sends authentication replies to access device 112(1) and the access device forwards the replies to client device 110(1). Authentication server 120(1) successfully authenticates client device 110(1) to an access port of access device 112(1) as indicated in authentication success message(s) 314, and a pairwise master key (PMK) may be provided to the client device and the access device.

After authentication, at 316, access device 112(1) and client device 110(1) exchange frames with each other in accordance with a session key agreement protocol that uses the PMK to derive a session key in the client device (i.e., a client device session key) and a session key in the access device (i.e., an access or network device session key) that matches the session key in the client device. That is, access device 112(1) and client device 110(1) implement the session key agreement protocol to derive respective session keys based on the PMK. Client device 110(1) and access device 112(1) may use their respective session keys to protect Open Systems Interconnection (OSI) layer 2 frames, e.g., Ethernet frames, exchanged between the two devices. Examples of session key agreement protocols include the MAC Security (MACsec) Key Agreement (MKA) protocol for wired Ethernet communications and the "4-way handshake" protocol for wireless communications under IEEE 802.11i. The MKA protocol derives the session keys based also on the temporary MAC source address, such that the session keys are based on or are a function of the temporary MAC source address. On the other hand, the 4-way handshake protocol does not derive the session keys based on the temporary MAC source address, such that the session keys are not based on the MAC source address.

At 330, client device 110(1) and access device 112(1) exchange frames with each other in accordance with an address allocation protocol to establish a unique local MAC address (also referred to as a "new MAC address") in the client device to be used by the client device instead of the temporary MAC address. That is, access device 112(1) and client device 110(1) implement the address allocation protocol to allocate/select the local MAC address and provide the local MAC address to the client device. In an embodiment, client device 110(1) and access device 112(1) user their respective session keys to secure or protect the frames exchanged in the address allocation protocol, and thereby secure or protect the protocol. For example, the session keys may be used to integrity protect and/or encrypt the exchanged frames under MACsec or IEEE 802.11 security association.

In one example of the address allocation protocol, client device 110(1) sends to access device 112(1) a request (i.e., a solicitation) for a local MAC address. In response, access device 112(1) selects a local MAC address from available local MAC addresses in pool 130(1), and sends the selected local MAC address to client device 110(1). In another example, access device 112(1) sends the local MAC address to client device 110(1) without a specific solicitation from the client device. In yet another example, client device 110(1) randomly selects a local MAC address and then implements a discovery protocol with network device 112(1) over LAN 104 to discover whether the randomly selected local MAC address is being used by another client device. If it is not being used, client device 110(1) continues to use the selected MAC address. Otherwise, client device 110(1) randomly selects another local MAC address and repeats the discovery process, until the client device settles on an unused local MAC address. Access device 112(1) may perform duplicate address detection based on the local MAC address selected by client device 110(1) and indicate back to the client device that the local MAC address may be used. Other address allocation protocols may be used.

In an embodiment, the session key agreement protocol 316 and the address allocation protocol 330 may combined together into a single protocol.

As mentioned above, the session key agreement protocol (e.g., the MKA protocol) implemented at 316 may derive the session keys based on the temporary MAC address. If that is the case, at 340, client device 110(1) and access device 112(1) implement the session key protocol again to derive new respective session keys based on the local MAC address instead of the temporary MAC address. On the other hand, if the session key agreement protocol (e.g., the 4-way handshake protocol) did not derive the session keys based on the temporary MAC address, key re-derivation at 340 is skipped and the existing session keys from 316 are maintained.

At 350, client device 110(1) uses the local MAC address as a source MAC address in a data frame sent by the client device to access device 112(1), and uses the last derived client device session key to integrity protect and/or encrypt at least a portion of the data frame, such as the data carried therein. Access device 112(1) receives the integrity protected and/or encrypted frame from client device 110(1) and determines whether the client device is using the local MAC address based on the received frame. For example, access device 112(1) may determine that client device 110(1) is using the local MAC address if the access device determines that the protected frame includes the local MAC address, and/or if the access device is able to integrity check and/or decrypt the protected frame successfully using the last derived access device session key. If access device 112(1) determines that client device 110(1) is using the local MAC address, network access 110(1) permits the client device to access organizational network 102(1) (i.e., grants the client device access to the organizational network). Otherwise, access device 112(1) denies client device access to organizational network 102(1). In addition, access device 112(1) uses the local MAC address as a MAC destination address in data frames sent by the access device to client device 110(1), and uses the last derived access device session key to integrity protect and/or encrypt at least a portion of the data frame.

The address allocation process described above in connection with FIG. 3 enables an access device to authenticate a client device, authorize the client device for its attachment to its organizational network using an identity credential, such as a manufacturing certificate, and to then provide the client device information to the organizational network along with a trackable local MAC address that is used by the client device while attached to the organizational network.

The embodiment depicted in FIG. 3 is referred to as a "secured" address allocation embodiment because the address allocation protocol at 330 is secured by the session keys, and the data frames exchanged at 350 are also secured or protected by the session keys. In an alternative "unsecured" address allocation embodiment, the protections implemented in the secured address allocation embodiment are omitted; that is, the address allocation protocol is not secured, and the exchanged data frames are not protected. Accordingly, the session key agreement protocol at 316 and 340 may be omitted in the unsecured address allocation embodiment because session keys are not needed. In an example, the unsecured address allocation embodiment may be used with wired Ethernet links of LAN 104.

Figure 4A:
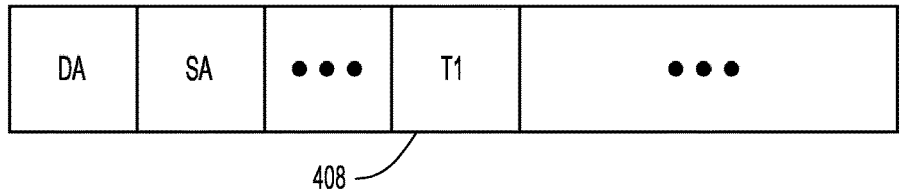
FIG. 4A is an illustration of a MAC address allocation request frame, according to an example embodiment.

With reference to FIG. 4A, there is an illustration of an example MAC address allocation request frame 405 (also referred to as an "address allocation request") that is sent from client device 110(1) to access device 112(1) or address server 202(1) to request a local MAC address for use by the client device instead of a temporary MAC address. Frame 405 may be an Ethernet frame, for example. Frame 405 may include a MAC destination address DA (e.g., a MAC address of access device 112(1) or address server 202(1) that is to receive the frame), a MAC source address SA (e.g., a MAC address of client device 110(1) that is sending the frame, such as the temporary MAC address of the client device), and a type field 408 (T1) to indicate that frame 405 is a MAC address allocation request frame. In another example, frame 405 includes a proposed local MAC address selected by client device 110(1) and which is to be vetted and either confirmed or denied by access device 112(1).

Figure 4B:
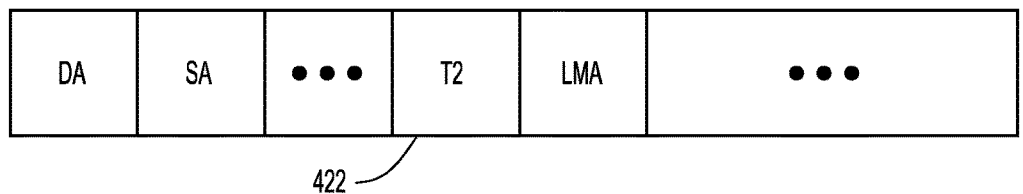
FIG. 4B is an illustration of a MAC address allocation frame, according to an example embodiment.

With reference to FIG. 4B, there is an illustration of an example MAC address allocation frame 420 that is sent from access device 112(1) or address server 202(1) to client device 110(1) to allocate a local MAC address to the client device. Frame 420 may be sent responsive to MAC address allocation request frame 405. Frame 420 may be an Ethernet frame, for example. Frame 420 may include a MAC destination address DA (e.g., a MAC address of client device 110(1) that is to receive the frame, such as the temporary MAC address of the client device), a MAC source address SA (e.g., a MAC address of access device 112(1) or address server 202(1) that is sending the frame), a type field 422 (T2) to indicate that frame 420 is a MAC address allocation frame, and an allocated local MAC address (LMA) to be used the client device instead of the temporary MAC address. Local MAC address LMA has the local/global bit therein set to indicate that is a local MAC address. In the example in which address allocation request frame 405 include a proposed local MAC address from client device 110(1), in response to the proposed local MAC address, address allocation frame 420 may include an additional flag (not shown in FIG. 4B) to indicate (e.g., Yes/No) whether the proposed local MAC address is acceptable for use by the client device.

Throughout the address allocation process described above in connection with FIG. 3, access devices 112 and/or address servers 202 may each store an address mapping database that contains information useful for methods described herein, such as allocated local MAC addresses mapped to client device credentials and various time stamps associated with those local MAC addresses. Access devices 112 may each add/create, update, and remove entries from respective MAC address mapping databases as the access devices recognize client device authentication session requests, allocate local MAC address to the client devices, and verify and monitor use of the allocated local MAC addresses. Thus, the address mapping database provides to network and security administrators a record of which client device is actually using a particular local MAC address at any point in time. For example, the mappings in the address mapping database can be used for accounting to identify which client devices are attached to an organizational network. The address mapping database also provides a way to identify client devices that are suspected of being compromised from a security perspective, by using a MAC source address in suspicious frames as a look-up or index to identity credentials in the address mapping database.

Figure 5:
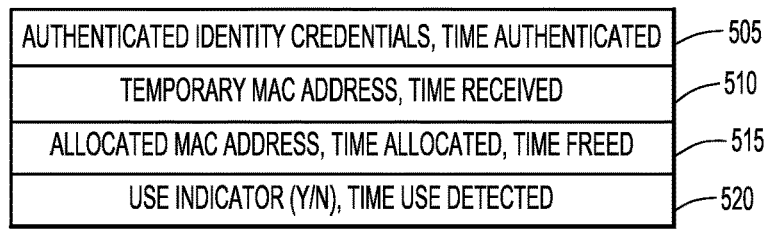
FIG. 5 is an illustration of a record or entry in an address mapping database, according to an example embodiment.

With reference to FIG. 5, there is an illustration of an example record 500 among many such records in a MAC address mapping database. Record 500 is created or added to the MAC address mapping database when an authentication session request is received from a client device. Record 500 includes: fields 505 that contain identity credentials of the client device, and an time (i.e., time stamp) when the client device is successfully authenticated; fields 510 that contain a temporary MAC address used by the client device, and a time when the temporary MAC address was received; fields 515 that contain a local MAC address allocated to the client device, a time when it was allocated, and a time when it was deallocated, i.e., the local MAC address becomes free/available for reallocation; fields 520 that contain a use indicator to indicate whether the allocated local MAC address is being used (e.g., a Yes flag) or is not being used (e.g., a No flag), and a time when the use indicator switched to indicate use.

Figure 6:
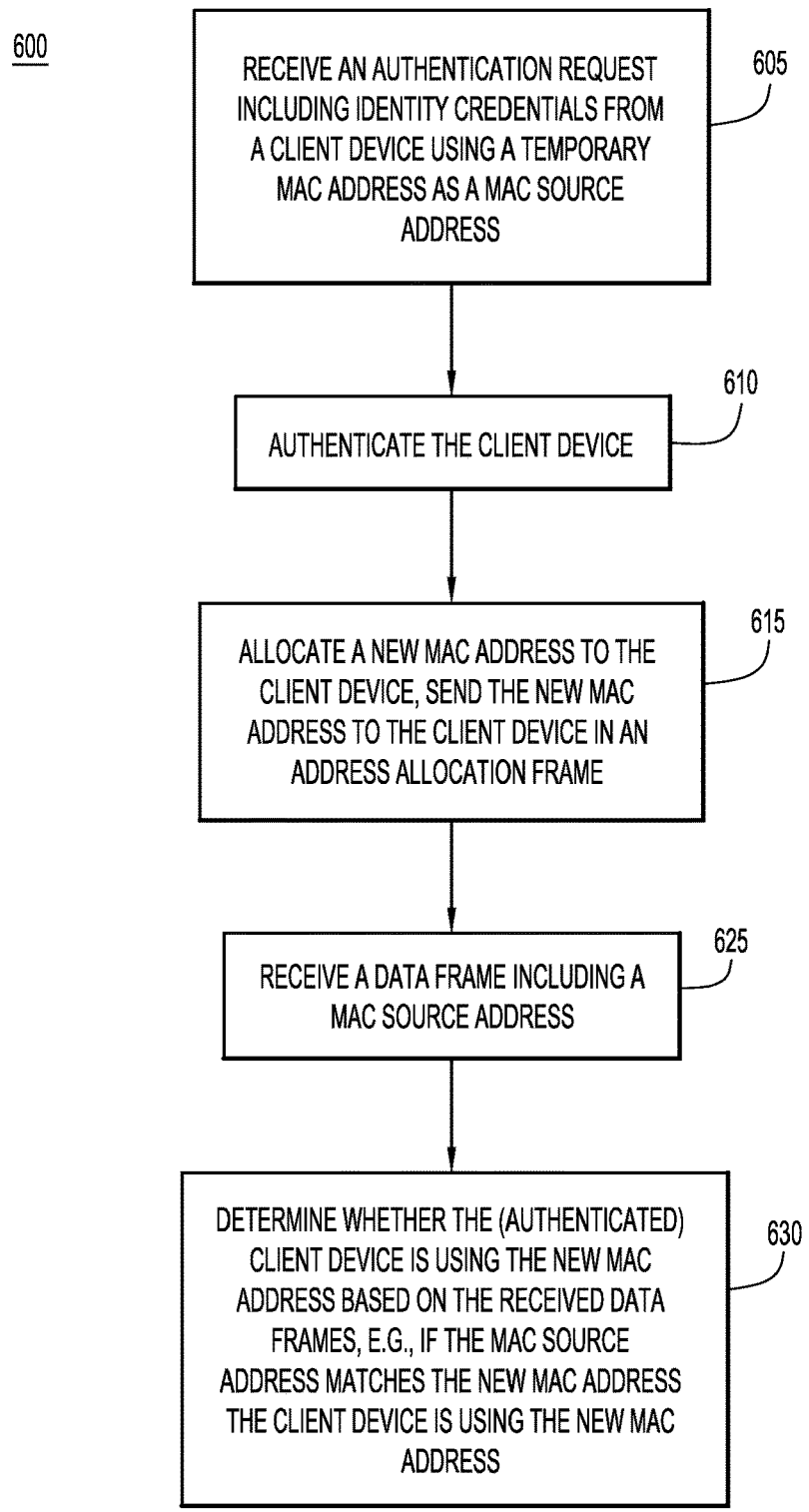
FIG. 6 is a flowchart of a method of allocating a local MAC address to a client device using an unsecured address allocation protocol as performed by a network access device and/or an address server, according to an example embodiment.
Figure 7:
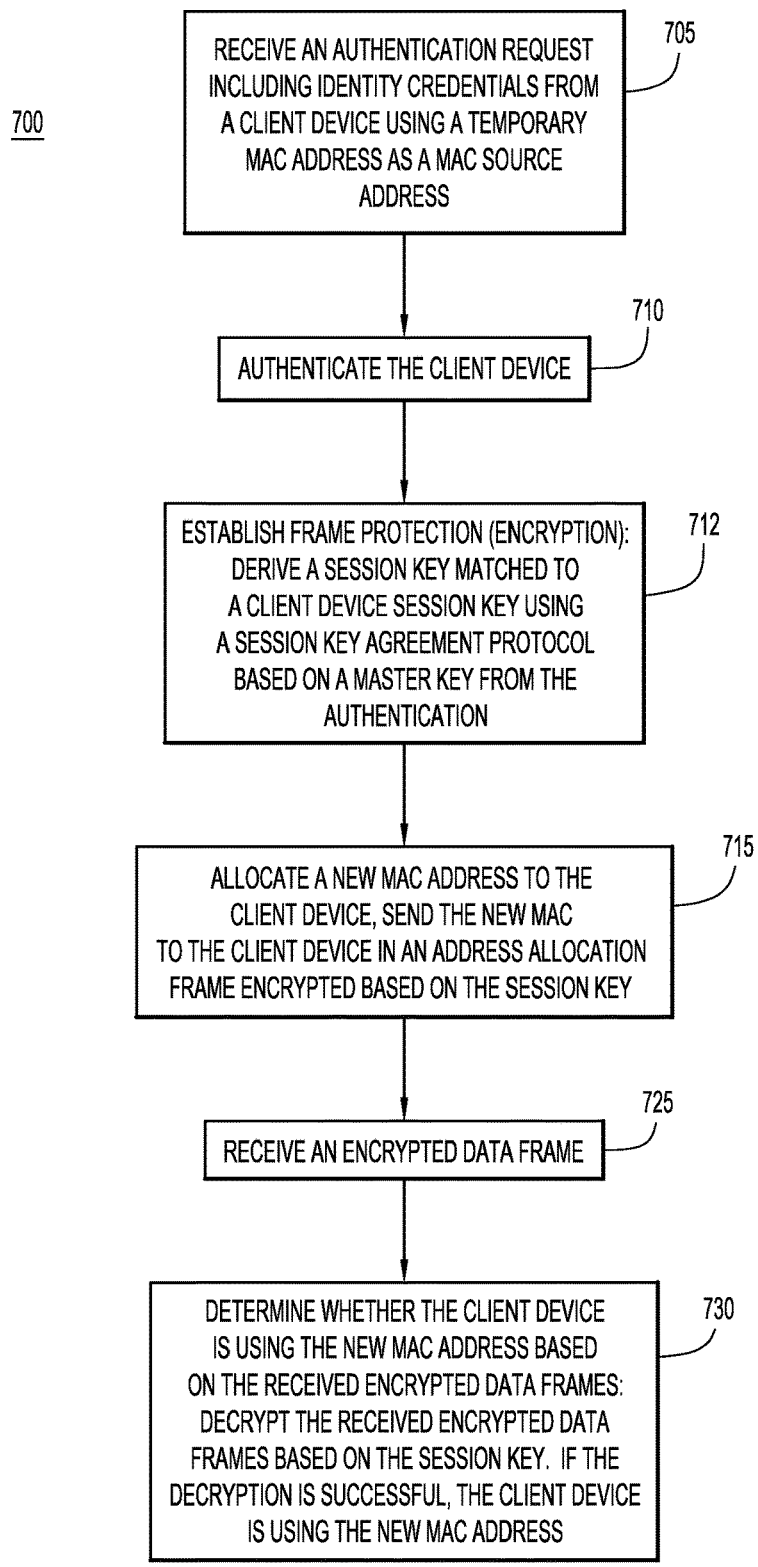
FIG. 7 is a flowchart of a method of allocating a local MAC address to a client device using a secured address allocation protocol as performed by a network access device and/or an address server, according to an example embodiment.
Figure 8:
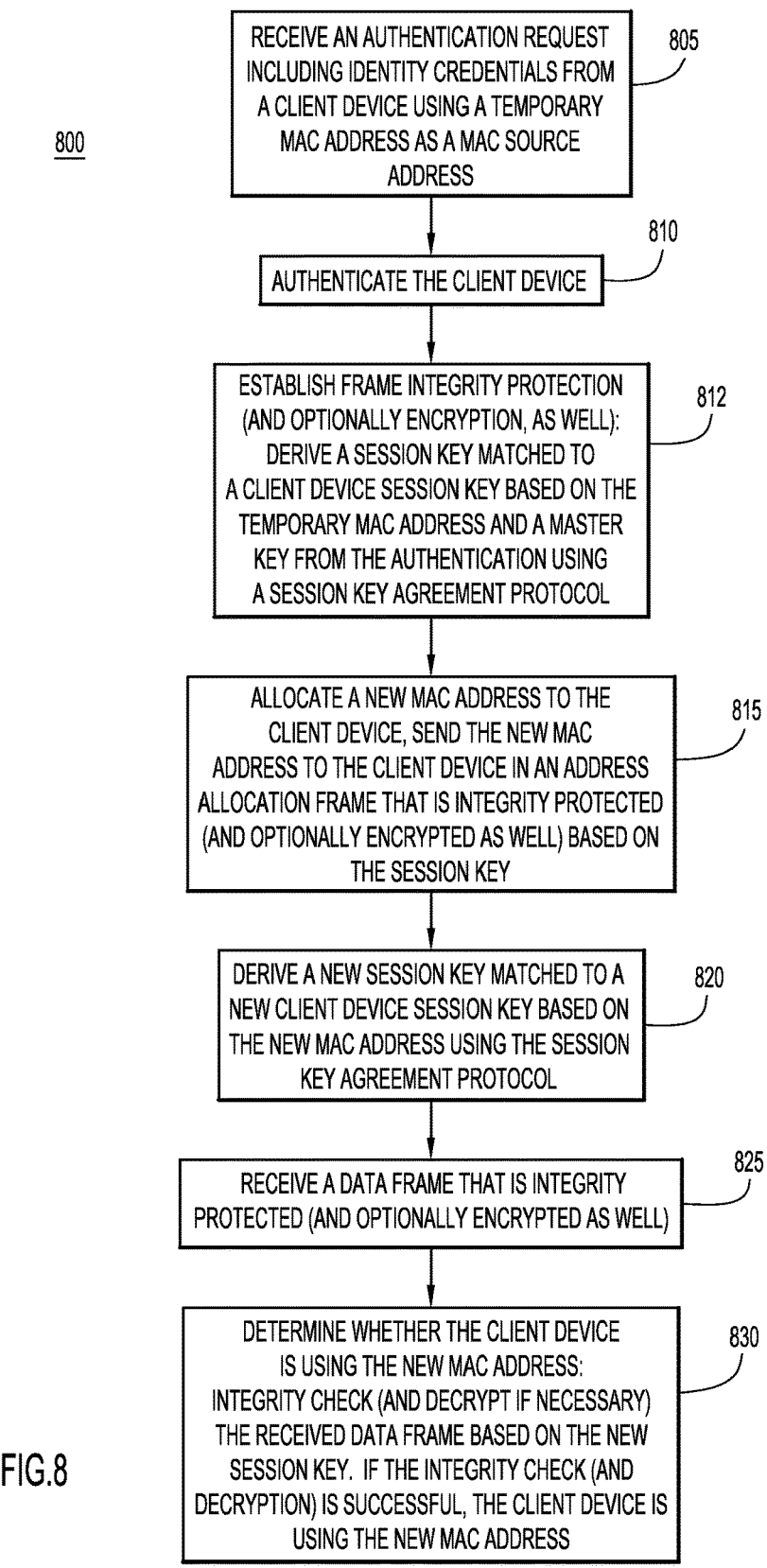
FIG. 8 is a flowchart of another method of allocating a local MAC address to a client device using a secured address allocation protocol as performed by a network access device and/or an address server, according to an example embodiment.

Various methods of allocating a local MAC address to client device 110(1) performed by access device 112(1) and/or address server 202 are now described in connection with FIGS. 6-8. The methods introduced in FIGS. 6-8 are based on the transaction framework discussed above in connection with FIG. 3, but variations are introduced in each method. Also, in each method, access device 112(1) and/or address server 202(1) creates and updates a corresponding address mapping database record (e.g., record 500) as described above.

With reference to FIG. 6, there is a flowchart of an example method 600 of allocating a local MAC address to client device 110(1) using an unsecured address allocation protocol, performed by access device 112(1) (and/or address server 202(1)). In an example, client device 110(1) and access device 112(1) communicate with each other over unsecured wired Ethernet links in method 600.

At 605, access device 112(1) receives from client device 110(1) an authentication session request including the identity credentials of the client device and the temporary MAC address as the MAC source address of the client device. Access device 112(1) creates a record, e.g., record 500, in the address allocation mapping database, and stores the temporary MAC address, identity credentials, and a time stamp (time of receipt) in the mapping database entry.

At 610, access device 112(1) successfully authenticates client device 110(1) using authentication server 120(1) and the identity credentials, and updates record 500 to indicate client device 110(1) is successfully authenticated and to include an associated time.

At 615, using an unsecured address allocation protocol, access device 112(1) allocates a local MAC address (referred to as a "new MAC address" in FIG. 6) to client device 110(1). Access device 112(1) updates record 500 with the local MAC address. Access device 112(1) sends the local MAC address to the client device in MAC address allocation frame 420 for use by the client device instead of the temporary MAC address, and updates record 500 with the local MAC address and a time at which the address allocation frame 420 was sent. In another example, access device 112(1) receives a proposed MAC address from client device 110(1), performs duplicate address detection on the proposed MAC address and, if the proposed MAC address is not already in use in LAN 104, sends an indication to the client device that the proposed MAC address may be used by the client device as a local MAC address, instead of the temporary MAC address.

At next operations 625 and 630, access device 112(1) waits for a predetermined time, from the time that the address allocation frame was sent, to receive an indication that client device 110(1) is using the allocated local MAC address, as described below. For example, at 625, access device 112(1) receives a data frame including a MAC source address from LAN 104. Assuming access device 112(1) received the data frame within the predetermined time period, at 630, the access device determines whether (authenticated) client device 110(1) is using the local MAC address based on the received data frame. To do this, access device 112(1) may determine whether the data frame includes a MAC source address that matches the local MAC address stored in record 500. If it is determined that the data frame includes the local MAC address as the MAC source address, access device 112(1) determines that client device 110(1) is using the local MAC address, and updates record 500 to indicate that use along with a time. Access device 112(1) also allows client device 110(1) to access organizational network 102(1), i.e., the data frame will be forwarded to organizational network.

If it is determined that the data frame does not include the local MAC address as the MAC source address, access device 112(1) determines that the local MAC address is not in use with respect to the received data frame.

If access device 112(1) does not receive the above-described indication of use of the local MAC address within the predetermined time period, the access device denies access to organizational network 102(1) to client device 110(1).

With reference to FIG. 7, there is a flowchart of an example method 700 of allocating a local MAC address to client device 110(1) using a secured address allocation protocol, performed by access device 112(1) (and/or address server 202(1)). In an example, client device 110(1) and access device 112(1) communicate with each other over WLAN links in accordance with any now known or hereafter developed wireless protocols, such as IEEE 802.11 (or 802.15), and implement wireless security protocols, such as IEEE 802.11i.

Operations 705 and 710 are similar to operations 605 and 610 in method 600. Authentication at 710 establishes a PMK in access device 112(1) and client device 110(1).

At 712, access device 112(1) (and client device 110(1)) establishes frame protection (encryption) in accordance with IEEE 80211i, for example. To do this, access device 112(1) derives an access device session key matched to a client device session key using a session key agreement protocol (e.g., the 4-way handshake protocol in 802.11i) based on the PMK.

At 715, using an address allocation protocol secured/protected based on the session key derived at 712, access device 112(1) allocates a local MAC address (referred to as a "new MAC address" in FIG. 7) to client device 110(1). Access device 112(1) encrypts address allocation frame 420 (which carries the allocated local MAC address) using the access device session key, and sends the encrypted frame local MAC address to client device 110(1). In another example, access device 112(1) receives a proposed MAC address from client device 110(1) in an encrypted frame, performs duplicate address detection on the proposed MAC address and, if the proposed MAC address is not already in use in LAN 104, sends in an encrypted frame an indication to the client device that the proposed MAC address may be used by the client device as a local MAC address, instead of the temporary MAC address.

At 725, access device 112(1) receives an encrypted data frame from LAN 104.

At 730, access device 112(1) determines whether the received encrypted data frame represents and indication that client device 110(1) is using the local MAC address. To do this, access device 112(1) attempts to decrypt the received data frame using the access device session key, and may also parse the data frame for a MAC source address, and determine whether the MAC source address matches the local MAC address. A successful decryption of the received encrypted data frame indicates that client device 110(1) is using the local MAC address. Even if the data frame includes a MAC source address that matches the local MAC address, if the access device 112(1) is unable to decrypt the data frame using the access device session key, it is determined that client device 110(1) is not using the local MAC address.

The operations of method 700 establish a chain of trust beginning with authentication operation 705 and extending through to decryption in operation 730. For example, the session keys and thus encryption states in access device 112(1) and client device 110(1) are linked to the authenticated identity credentials and the temporary MAC address. Also, the local MAC address is linked to the temporary MAC address and recorded in the address mapping table. If the access device 112(1) is able to decrypt the encrypted data frame from client device 110(1), then that success confirms the linked encryption states and thus the use of the local MAC address by client device 110(1), through the chain of trust.

With reference to FIG. 8, there is a flowchart of an example method 800 of allocating a local MAC address to client device 110(1) using another secured address allocation protocol, performed by access device 112(1) (and/or address server 202(1)). In an example, client device 110(1) and access device 112(1) communicate with each other over wired Ethernet links and implement security protocols in accordance with the MACsec protocol (IEEE 802.11AE). MACsec provides for frame integrity protection alone, or optionally integrity protection with encryption.

Operations 805 and 810 are similar to operations 605/705 and 610/710 in methods 600/700. Authentication at 810 establishes a PMK (referred to as a Connectivity Association Key (CAK) in the context of MACsec) in access device 112(1) and client device 110(1).

At operation 812, access device (and client device 110(1)) establishes MACsec frame integrity protection (and optionally encryption, as well). To do this, access device 112(1) derives an access device session key matched to a client device session key based on the temporary MAC address and the CAK using the MACsec Key Agreement (MKA) protocol.

At 815, using an address allocation protocol secured/protected based on the session key derived at 812, e.g., an address allocation protocol that is secured/protected by MACsec, access device 112(1) allocates a local MAC address (referred to as a "new MAC address" in FIG. 8) to client device 110(1). Access device 112(1) integrity protects and optionally encrypts address allocation frame 420 (which carries the allocated local MAC address), and sends the resulting MACsec frame to client device 110(1). In another example, access device 112(1) receives a proposed MAC address from client device 110(1) in an integrity protected and optionally encrypted frame, performs duplicate address detection on the proposed MAC address and, if the proposed MAC address is not already in use in LAN 104, sends in an integrity protected and optionally encrypted frame an indication to the client device that the proposed MAC address may be used by the client device as a local MAC address, instead of the temporary MAC address.

At 820, access device 112(1) derives a new access device session key matched to a new client device session key based on the local MAC address and the CAK using the MKA protocol.

At 825, access device 112(1) receives a data frame that is integrity protected (and optionally encrypted as well) by MACsec. An example of an integrity protected and encrypted MACsec data frame is described below in connection with FIG. 11.

At 830, access device 112(1) determines whether client device 110(1) is using the new MAC address. To do this, access device 112(1) integrity checks (and decrypts if necessary) the received MACsec data frame based on the new access device session key. If the MACsec integrity check (and decryption) is successful, client device 110(1) is determined to be using the local MAC address. Otherwise, client device 110(1) is determined not to be using the local MAC address.

Figure 9:
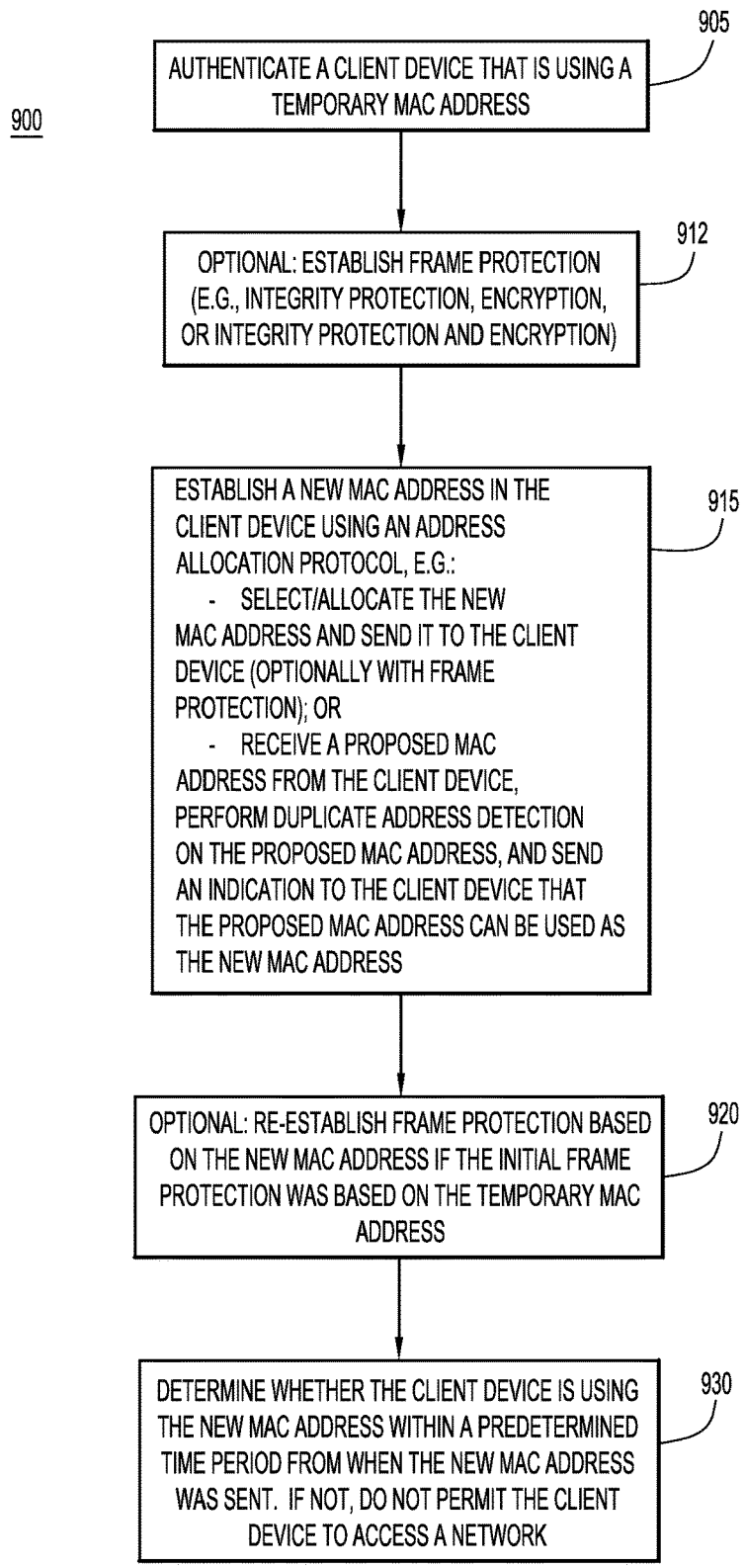
FIG. 9 is a flowchart of a generalized method of allocating a local MAC address to a client device using either a secured or an unsecured address allocation protocol as performed by a network access device and/or an address server, according to an example embodiment.

With reference to FIG. 9, there is a flowchart of an example generalized method 900 of allocating a local MAC address to client device 110(1) using a secured or an unsecured address allocation protocol, performed by access device 112(1) (and/or address server 202(1)). Generalized method 900 incorporates/combines features of methods 600-800.

At 905, access device authenticates client device 110(1) using its temporary MAC address.

At 912, access device 112(1) optionally establishes frame protection (e.g., under 802.11i or MACsec).

At 915, access device 112(1) allocates a local MAC address (referred to as a "new MAC address" in FIG. 9) to client device 110(1), and sends the local MAC address to client device 110(1), optionally with frame protection. In another embodiment, client device 110(1) selects its own local MAC address and access device 112(1) validates the selection, as mentioned above in connection with operations 615, 715, and 815.

At 920, access device 112(1) optionally re-establishes frame protection based on the local MAC address if the initial frame protection at 912 was based on the temporary MAC address (e.g., using MACsec).

At 930, access device 112(1) determines whether client device 110(1) is using the local MAC address within a predetermined time period from when the local MAC address was allocated in 915. If it is determined that client device 110(1) is not using the local MAC address within the time period, the client device is denied access to organizational network 102(1).

Figure 10:
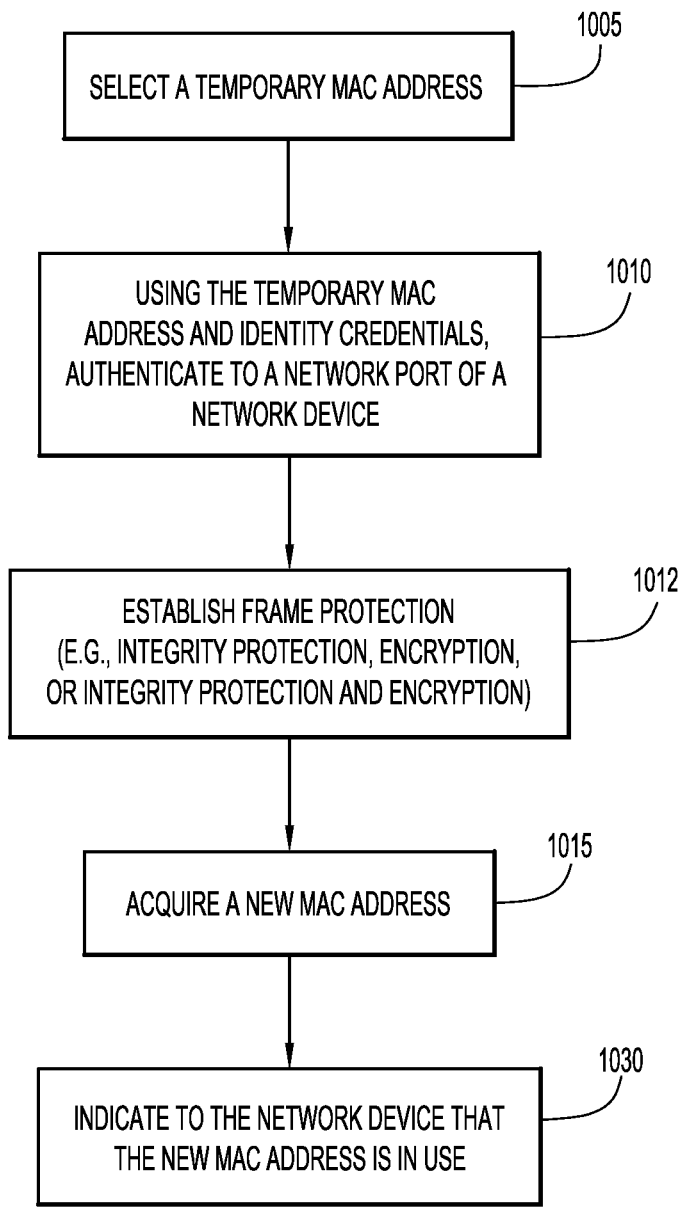
FIG. 10 is a flowchart of an example method of allocating a local MAC address to a client device using an address allocation protocol as performed by the client device, according to an example embodiment.

With reference to FIG. 10, there is a flowchart of an example method 1000 of allocating a local MAC address to client device 110(1) using an address allocation protocol, performed by the client device. Method 1000 is the client side equivalent to access device methods 600-900

At 1005, client device 110(1) selects a temporary MAC address to be used as a MAC source address.

At 1010, client device 110(1) uses the temporary MAC address and identity credentials of the client device to authenticate to a network port of access device 112(1).

At 1012, client device 110(1) optionally establishes frame protection (e.g., integrity protection, encryption, or integrity protection and encryption), for example, in accordance with 802.11i or MACsec security protocols.

At 1015, client device 110(1) acquires a local MAC address (referred to as a "new MAC address" in FIG. 10) in accordance with either a secure or an unsecured address allocation protocol, as described above. For example, client device 110(1) may send an address allocation request frame to access device 112(1) and receive an address allocation frame from the access device in response. Alternatively, client device 110(1) may send one or more proposed MAC addresses to access device 112(1) and then receive an indication from the access device that one of the proposed MAC address is to be used as the local MAC address. Client device 110(1) may send and receive integrity protected, encrypted, or integrity protected and encrypted frames in this operation.

After acquiring the local MAC address, client device 110(1) optionally re-establishes frame protection using the local MAC address instead of the temporary MAC address if frame protection in operation 1012 was established based on the temporary MAC address.

At 1030, client device 110(1) indicates to access device 112(1) that the client device is using the local MAC address. For example, client device 110(1) sends to access device 112(1) a data frame based on the local MAC address. Client device 110(1) optionally integrity protects, encrypts, or integrity protects and encrypts) the data frame using the latest session key derived for frame protection.

Figure 11:
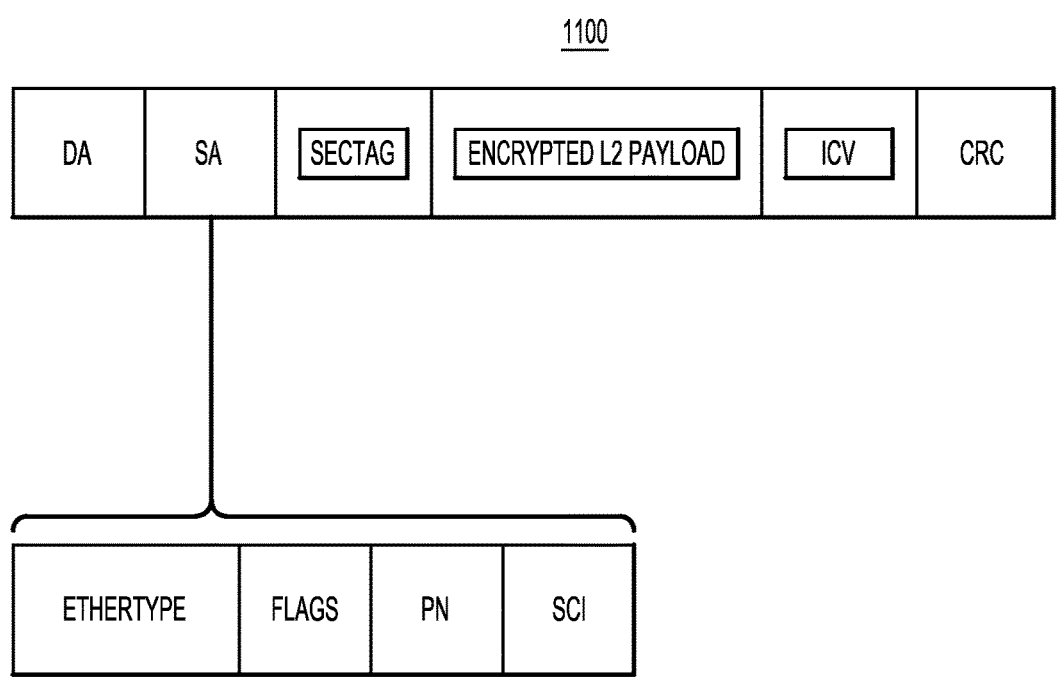
FIG. 11 is an illustration of an IEEE MAC security (MACsec) frame, according to an example embodiment.

With reference to FIG. 11, there is an illustration of an example integrity protected and encrypted MACsec frame 1100. MACsec frame 1100 includes a MAC source address (SA), a MAC destination address (DA), a security header (SecTag) used to identify a security association that was used to protect the MACsec frame, an encrypted layer 2 payload, an integrity check value (ICV)/message authentication code, and a cyclic redundancy check (CRC) field. The MAC source address SA may be the local MAC address allocated according to the methods above. In other examples, the MACsec frame may include only integrity protection in the form of the ICV, but not encryption, i.e., no encrypted payload.

The security tag SecTag includes an Ethernet type (EtherType), a set of "flags," a packet number (PN), and a Secure Channel Identifier (SCI). The SCI typically includes a MAC address and a port identifier that collectively identify a security association that was used to protect MACsec frame 1100. The MAC address in the SCI need not be the same as the MAC source address SA in MACsec frame 1100. Therefore, it is possible for the device originating MACsec frame 1100 to use any MAC address as an identity, such as the local MAC address.

Figure 12:
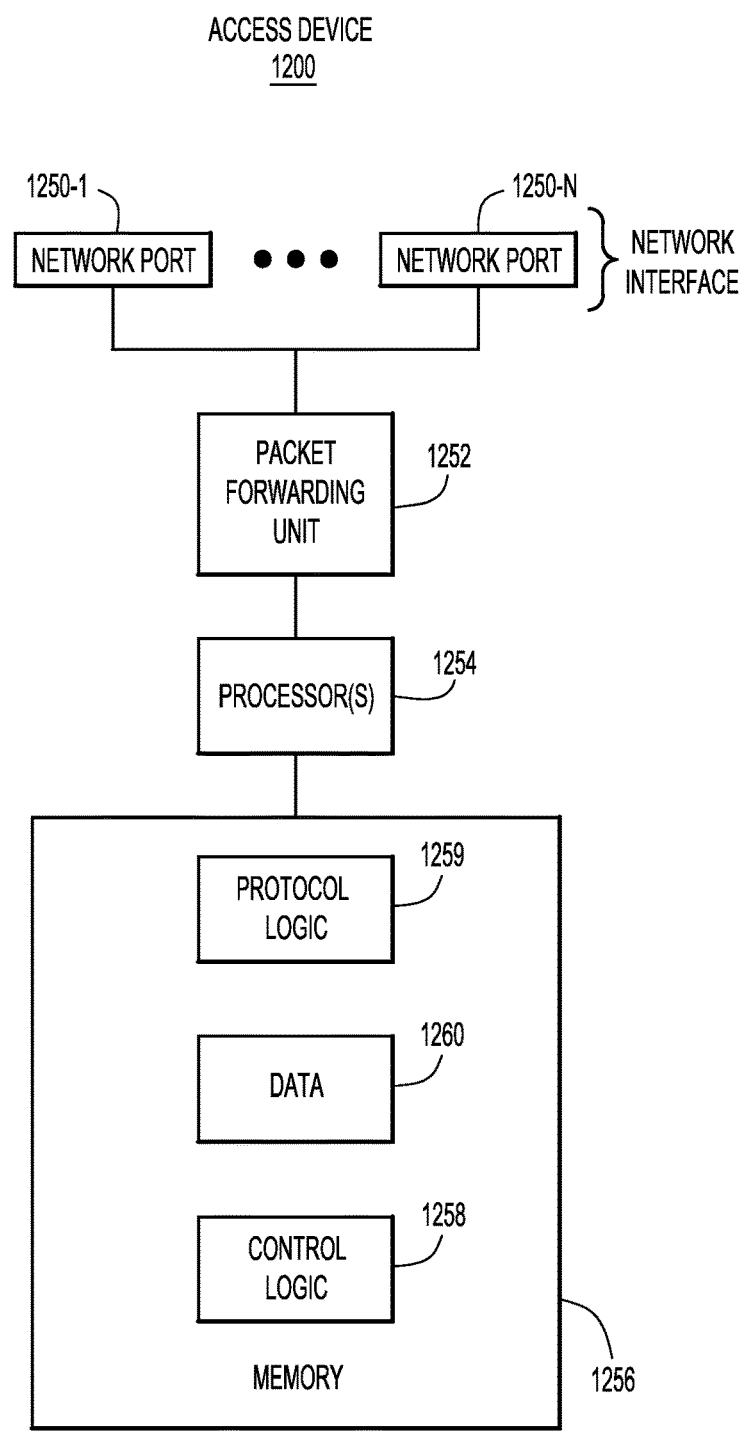
FIG. 12 is a block diagram of a network access device or an address server configured to preform MAC address allocation methods, according to an embodiment.

With reference to FIG. 12, there is a block diagram of a network device 1200 representative of access devices 112(1), 112(2), or address servers 202(1), 202(2). Access device 1200 may include a plurality of wired and/or wireless network ports 1250-1 through 1250-N or other form of network interface to communicate with wired and/or wireless communication networks, a packet forwarding unit 1252 having forward tables used to make packet forwarding decisions, a processor 1254 (or multiple processors) and memory 1256. The memory stores instructions for implementing methods described herein.

The memory 1256 may comprise read only memory (ROM), random access memory (RAM), magnetic disk storage media devices, optical storage media devices, flash memory devices, electrical, optical, or other physical/tangible (non-transitory) memory storage devices. The processor 1254 is, for example, a microprocessor or a microcontroller that executes instructions stored in memory. Thus, in general, the memory 1256 may comprise one or more tangible computer readable storage media (e.g., a memory device) encoded with software comprising computer executable instructions and when the software is executed (by the processor 1254) it is operable to perform the operations described herein. Memory 1256 stores control logic 1258 to perform the address allocation methods/operations described herein, such as methods 600-900, protocol logic 1259 to perform security protocols, such as MACsec, IEEE 802.11i, MKA, the 4-way handshake, and the like. The memory may also store data 1260 used and generated by logic 1258 and 1259, such as a pool of available local MAC addresses, records of an address allocation mapping database, session keys, and protocol timeout periods.

Figure 13:
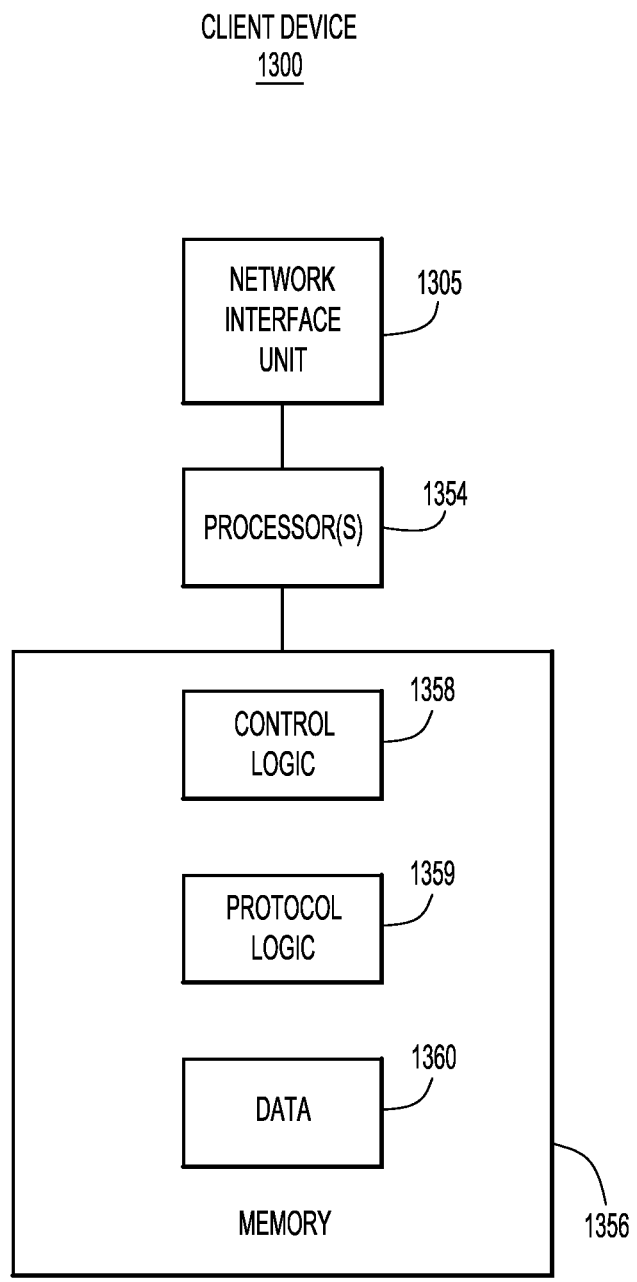
FIG. 13 is a block diagram of a client device configured to preform MAC address allocation methods, according to an embodiment.

With reference to FIG. 13, there is a block diagram of a client device 1300 (e.g., client device 110(1) or 110(2)), according to an embodiment. Client device 1300 includes network interface unit 1305 to communicate with a wired and/or wireless communication network, a processor 1354

(or multiple processors), and memory 1356. Network interface unit 1305 may include an Ethernet card to communicate over wired Ethernet links and/or a wireless communication card to communicate over wireless links.

Memory 1356 stores instructions for implementing methods described herein. Memory 1356 may comprise read only memory (ROM), random access memory (RAM), magnetic disk storage media devices, optical storage media devices, flash memory devices, electrical, optical, or other physical/tangible (non-transitory) memory storage devices. The processor 1354 is, for example, a microprocessor or a microcontroller that executes instructions stored in memory. Thus, in general, the memory 1356 may comprise one or more tangible computer readable storage media (e.g., a memory device) encoded with software comprising computer executable instructions and when the software is executed (by the processor 1354) it is operable to perform the operations described herein. Memory 1356 stores control logic 1358 to perform the address allocation methods/operations described herein, such as method 1000, protocol logic 1359 to perform security protocols, such as MACsec, IEEE 802.11i, MKA, the 4-way handshake, and the like. The memory may also store data 1360 used and generated by logic 1358 and 1359, such as a pool of available local MAC addresses and session keys.

In summary, a client device, such as an Ethernet device, is admitted to a network by an access device and allocated a local MAC address to participate in that network. The access device admitting the client device to the network restricts access by the client device based on the allocated local MAC address. The access device also keeps a log/record denoting which client devices were given which local MAC addresses. The log may be used for network troubleshooting, threat detection (i.e., identification of compromised device), and other network management uses. The local MAC address allocation techniques defend the allocation of local MAC addresses against devices' spoofing of in-use local MAC addresses (including accidental spoofing due to non-cooperative allocation strategies). The techniques also provide a high quality record of which devices within an organization are using particular local MAC addresses at any point in time. The techniques also help avoid the need to purchase large blocks of global addresses in environments that do not need persistent identities because local MAC addresses may be used in a coordination fashion instead.

In summary, in one form, a method is provided comprising: at a network device connected with a network: receiving from a client device an authentication request including identity credentials and a temporary media access control (MAC) address of the client device; in response to successfully authenticating the client device based on the identity credentials: establishing a new MAC address in the client device; receiving a data frame; determining whether the client device is using the new MAC address based on the received data frame; an if it is determined that the client device is using the new MAC address, granting the client device access to the network.

In another form, an apparatus is provided comprising: a network interface unit configured to communicate with a client device and a network; and a processor coupled to the network interface unit, and configured to: receive from the client device an authentication request including identity credentials and a temporary media access control (MAC) address of the client device; in response to successfully authenticating the client device based on the identity credentials: establish a new MAC address in the client device; receive a data frame; determine whether the client device is using the new MAC address based on the received data frame; and if it is determined that the client device is using the new MAC address, grant the client device access to the network.

In yet another form, a non-transitory processor readable medium is provided. The processor readable medium stores instructions that, when executed by a processor, cause the processor to: receive from a client device an authentication request including identity credentials and a temporary media access control (MAC) address of the client device; in response to successfully authenticating the client device based on the identity credentials: establish a new MAC address in the client device; receive a data frame; determine whether the client device is using the new MAC address based on the received data frame; and if it is determined that the client device is using the new MAC address, grant the client device access to a network.

The above description is intended by way of example only. Various modifications and structural changes may be made therein without departing from the scope of the concepts described herein and within the scope and range of equivalents of the claims.

What is claimed is:

1. A method comprising:
    at a network device connected with a network:
        receiving from a client device an authentication request including identity credentials and a temporary media access control (MAC) address of the client device; and
        in response to successfully authenticating the client device based on the identity credentials:
            selecting a new MAC address of the client device from among a plurality of available MAC addresses stored in a MAC address server in the network;
            sending the new MAC address to the client device in an address allocation frame;
            receiving a data frame;
            determining whether the client device is using the new MAC address based on the received data frame; and
            if it is determined that the client device is using the new MAC address:
                granting the client device access to the network; and
                generating a record including the new MAC address, a time at which the new MAC address was selected, the identity credentials, and a time at which the client device was successfully authenticated based on the identity credentials.

2. The method of claim 1, wherein the new MAC address is a local MAC address.

3. The method of claim 1, wherein the determining includes determining whether the client device is using the new MAC address within a predetermined time period after the sending; and further comprising:
    if it is determined that the client device is not using the new MAC address within the predetermined time period after the sending, preventing the client device from accessing the network.

4. The method of claim 1, further comprising integrity protecting the address allocation frame based on the new MAC address to produce an integrity protected address allocation frame, and wherein:
    the sending includes sending the integrity protected address allocated frame;

the receiving includes receiving the data frame as an integrity protected data frame having a source MAC address that matches the new MAC address; and the determining includes:

integrity checking the integrity protected data frame based on the new MAC address; and if the integrity checking is successful, determining that the client device is using the new MAC address.

5. The method of claim 1, further comprising encrypting and integrity protecting the address allocation frame based on the new MAC address to produce an encrypted, integrity protected address allocation frame, and wherein:

the sending further includes sending the encrypted, integrity protected address allocation frame;

the receiving further includes receiving the data frame as an encrypted, integrity protected data frame; and the determining further includes:

decrypting and integrity checking the encrypted, integrity protected data frame based on the new MAC address; and if the decrypting is successful and the integrity checking is successful, determining that the client device is using the new MAC address.

6. The method of claim 1, further comprising encrypting the address allocation frame based on a session key associated with the new MAC address to produce an encrypted address allocation frame, and wherein:

the sending includes sending the encrypted address allocation frame;

the receiving includes receiving the data frame as an encrypted data frame; and the determining includes:

decrypting the encrypted data frame based on the session key; and if the decrypting is successful, determining the client device is using the new MAC address.

7. The method of claim 6, further comprising:

receiving a master key from the authenticating; and deriving the session key from the master key, wherein the session key is matched to another session key in the client device.

8. An apparatus comprising:

a network interface unit configured to communicate with a client device and a network; and a processor coupled to the network interface unit, and configured to:

receive from the client device an authentication request including identity credentials and a temporary media access control (MAC) address of the client device; and in response to successfully authenticating the client device based on the identity credentials:

select a new MAC address of the client device from among a plurality of available MAC addresses stored in a MAC address server in the network;

send the new MAC address to the client device in an address allocation frame;

receive a data frame;

determine whether the client device is using the new MAC address based on the received data frame; and if it is determined that the client device is using the new MAC address:

grant the client device access to the network; and generate a record including the new MAC address, a time at which the new MAC address was selected, the identity credentials, and a time at which the client device was successfully authenticated based on the identity credentials.

9. The apparatus of claim 8, wherein the new MAC address is a local MAC address.

10. The apparatus of claim 8, wherein the processor is further configured to:

determine whether the client device is using the new MAC address within a predetermined time period after the sending; and if it is determined that the client device is not using the new MAC address within the predetermined time period after the sending, prevent the client device from accessing the network.

11. The apparatus of claim 8, wherein the processor is further configured to integrity protect the address allocation frame based on the new MAC address to produce an integrity protected address allocation frame, and wherein:

the processor is configured to send by sending the integrity protected address allocated frame;

the processor is configured to receive by receiving the data frame as an integrity protected data frame having a source MAC address that matches the new MAC address; and the processor is configured to determine by:

integrity checking the integrity protected data frame based on the new MAC address; and if the integrity checking is successful, determining that the client device is using the new MAC address.

12. The apparatus of claim 8, wherein the processor is further configured to encrypt the address allocation frame based on a session key associated with the new MAC address to produce an encrypted address allocation frame, and wherein:

the processor is configured to send by sending the encrypted address allocation frame;

the processor is configured to receive by receiving the data frame as an encrypted data frame; and the processor is configured to determine by:

decrypting the encrypted data frame based on the session key; and if the decrypting is successful, determining the client device is using the new MAC address.

13. A tangible processor readable medium storing instructions that, when executed by a processor, cause the processor to:

receive from a client device an authentication request including identity credentials and a temporary media access control (MAC) address of the client device; and in response to successfully authenticating the client device based on the identity credentials:

select a new MAC address of the client device from among a plurality of available MAC addresses stored in a MAC address server in a network;

send the new MAC address to the client device in an address allocation frame;

receive a data frame;

determine whether the client device is using the new MAC address based on the received data frame; and if it is determined that the client device is using the new MAC address:

grant the client device access to the network; and generate a record including the new MAC address, a time at which the new MAC address was selected, the identity credentials, and a time at which the client device was successfully authenticated based on the identity credentials.

14. The processor readable medium of claim 13, further comprising instructions to cause the processor to integrity protect the address allocation frame based on the new MAC address to produce an integrity protected address allocation frame, and wherein:
   the instructions to cause the processor to send include instructions to cause the processor to send the integrity protected address allocated frame;
   the instructions to cause the processor to receive include instructions to cause the processor to receive the data frame as an integrity protected data frame having a source MAC address that matches the new MAC address; and
   the instructions to cause the processor to determine include instructions to cause the processor to determine by:
      integrity checking the integrity protected data frame based on the new MAC address; and
      if the integrity checking is successful, determining that the client device is using the new MAC address.

15. The processor readable medium of claim 13, further comprising instructions to cause the processor to encrypt the address allocation frame based on a session key associated with the new MAC address to produce an encrypted address allocation frame, and wherein:
   the instructions to cause the processor to send include instructions to cause the processor to send the encrypted address allocation frame;
   the instructions to cause the processor to receive include instructions to cause the processor to receive the data frame as an encrypted data frame; and
   the instructions to cause the processor to determine include instructions to cause the processor to determine by:
      decrypting the encrypted data frame based on the session key; and
      if the decrypting is successful, determining the client device is using the new MAC address.

16. The processor readable medium of claim 15, further comprising instructions to cause the processor to:
   receive a master key from the authenticating; and
   derive the session key from the master key, wherein the session key is matched to another session key in the client device.

17. The processor readable medium of claim 13, wherein the new MAC address is a local MAC address.

18. The processor readable medium of claim 13, wherein the instructions to cause the processor to determine include instructions to cause the processor to determine whether the client device is using the new MAC address within a predetermined time period after sending the new MAC address to the client device, and further comprising instructions to cause the processor to:
   if it is determined that the client device is not using the new MAC address within the predetermined time period after sending the new MAC address to the client device, prevent the client device from accessing the network.

19. The method of claim 1, wherein the record further includes the temporary MAC address and a time at which the temporary MAC address was received.

20. The method of claim 1, wherein the record further includes a time at which the new MAC address becomes available for re-selection from among the plurality of available MAC addresses.

21. The method of claim 1, wherein the record further includes an indication of whether the client device is using the new MAC address, and a time at which the indication was made.

* * * * *